Figure 6:
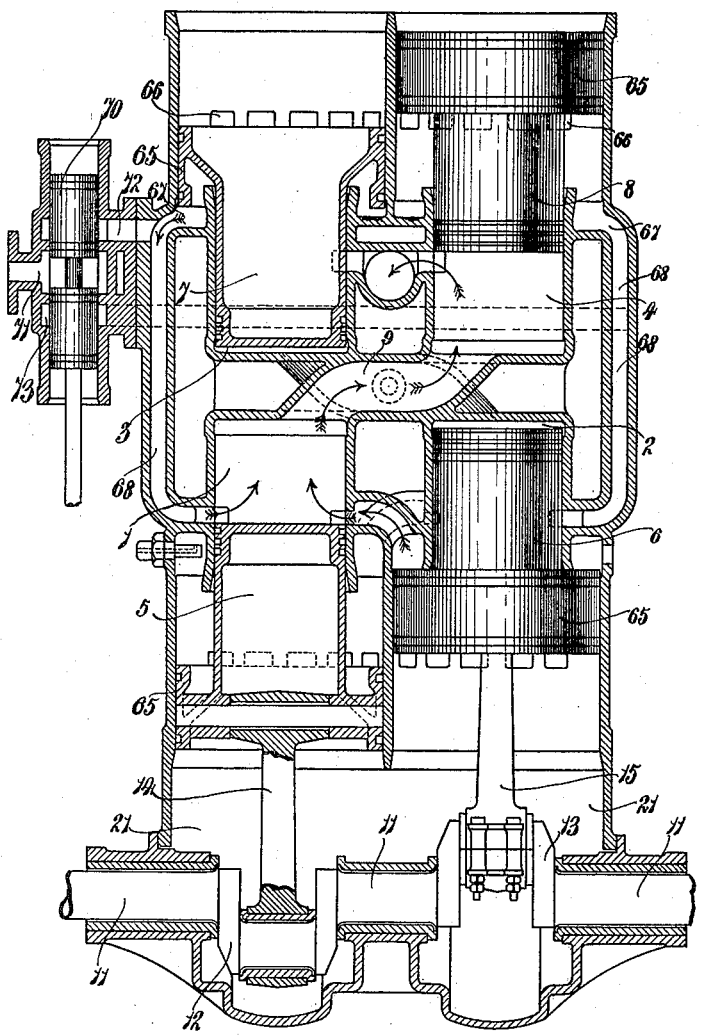

T. REID.
TWO-STROKE CYCLE COMBUSTION ENGINE.
APPLICATION FILED NOV. 28, 1913.
1,152,659.
Patented Sept. 7, 1915.
4 SHEETS—SHEET 1.
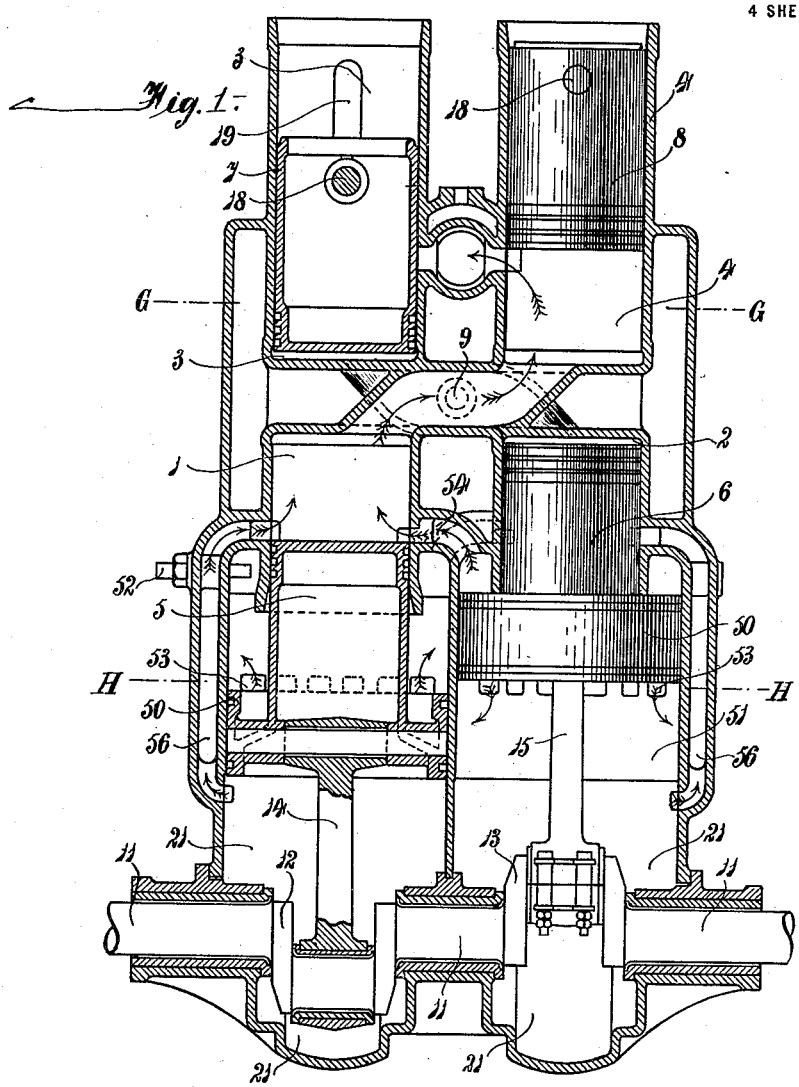

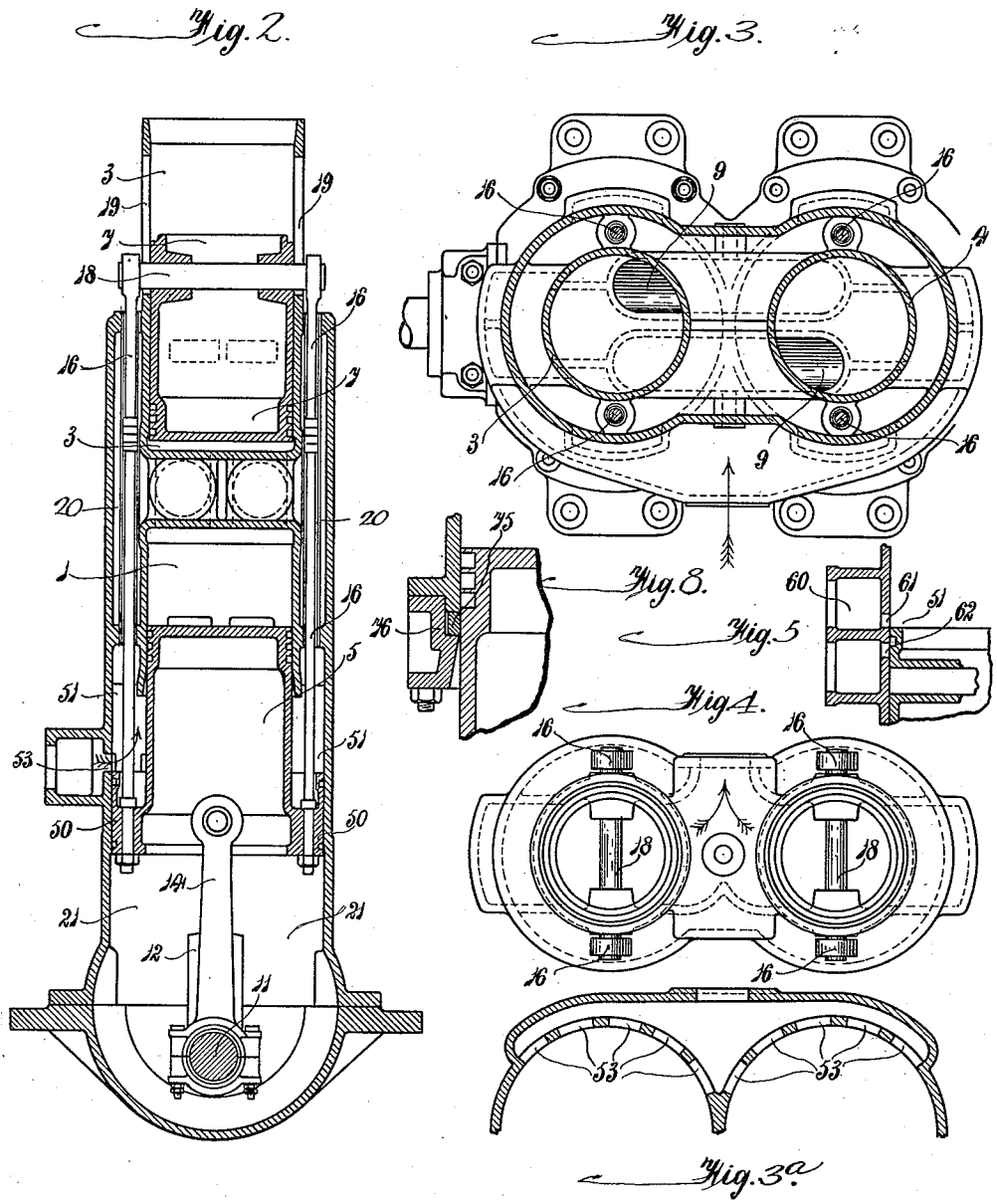

T. REID.
TWO-STROKE CYCLE COMBUSTION ENGINE.
APPLICATION FILED NOV. 28, 1913.

1,152,659.

Patented Sept. 7, 1915.
4 SHEETS—SHEET 3.

Witnesses:

Inventor:
Thomas Reid
by B. Singer Atty

T. REID.
TWO-STROKE CYCLE COMBUSTION ENGINE.
APPLICATION FILED NOV. 28, 1913.

1,152,659.

Patented Sept. 7, 1915.
4 SHEETS—SHEET 4.

UNITED STATES PATENT OFFICE.

THOMAS REID, OF NORTHFIELD, BIRMINGHAM, ENGLAND.

TWO-STROKE-CYCLE COMBUSTION-ENGINE.

1,152,659.   Specification of Letters Patent.   Patented Sept. 7, 1915.

Application filed November 28, 1913. Serial No. 803,579.

*To all whom it may concern:*

Be it known that I, THOMAS REID, subject of the King of Great Britain, residing at 50 Norman road, Northfield, Birmingham, in the county of Warwick, England, have invented a new and useful Two-Stroke-Cycle Combustion-Engine; and I do hereby declare the following to be a full, clear, and exact description of the same.

My invention comprises improvements in two stroke cycle internal combustion engines, and refers to that class of engine in which two oppositely acting pistons are connected to a crank shaft with cranks on opposite sides to which they simultaneously transmit impulses in opposite directions from an explosion or rapid combustion in a combustion chamber common to both pistons, and in which two pairs of pistons are employed, the pistons of each pair being arranged tandem fashion, *i. e.* substantially in alinement, the pistons being located in four cylinders the outer cylinder of each pair being connected to the inner cylinder of the other pair or line by a passage, constituting a combustion space common to both cylinders; all four pistons being thus adapted to receive working impulses.

Prior to this invention it has been proposed to construct a two stroke cycle internal combustion engine of the type specified with one piston of each pair of the annular type while the outer end of the cylinder containing the annular piston is closed, the outer end of this piston and the enlarged portion thereof acting as pumps for supplying the charge and scavenging the engine; but in this prior construction the passages connecting the cylinders were of considerable length making it impossible for the engine to be used with high compression, while the pistons in each line or pair were connected by a piston rod passing through stuffing boxes. Such stuffing boxes being at the combustion ends of the cylinders were obviously objectionable in use owing to the difficulty in maintaining the packing in a gas tight manner, while in addition the stuffing boxes make it impossible for the ends of the cylinders to be brought close together in order to obtain high compression.

In another form of two stroke cycle internal combustion engine of somewhat similar general design it was proposed to connect the associated cylinders by short passages and to connect the associated pistons by side rods, but in this engine the pistons were not constructed and arranged so as to act as pumps for supplying the charge and for scavenging the engine, separate and independently operated pumps being employed for this purpose; while a somewhat similar arrangement of engine has been proposed for operation on the well known four stroke cycle principle, but in this case mechanically operated valves were employed.

Figure 7:
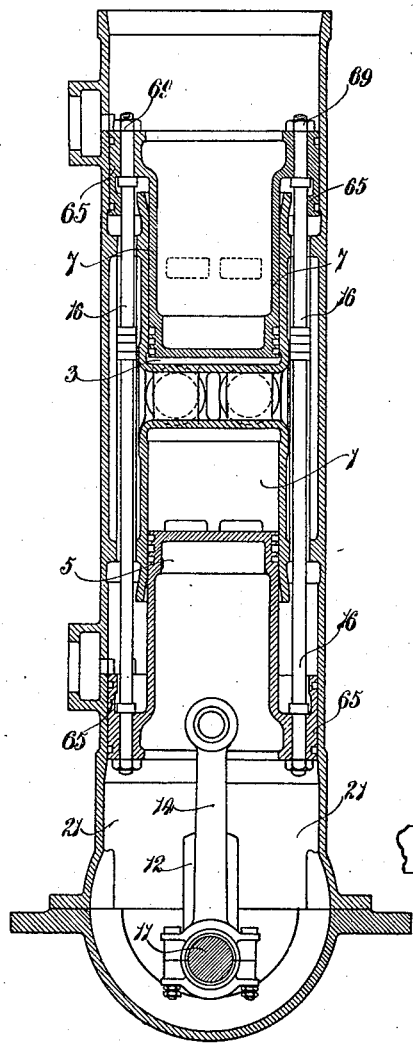
Figure 9:
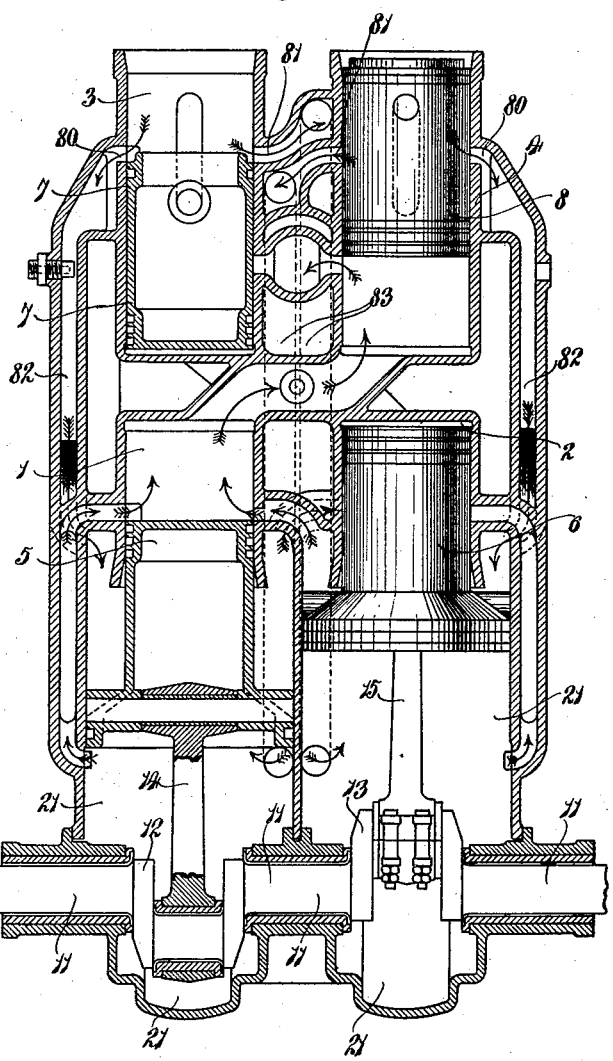

Referring to the drawings forming a part hereof and illustrating practical forms embodying my invention Figure 1 is a section of a form of the invention in which the lower piston is of the annular or stepped trunk type, the annular part of the larger piston supplying the combustible charge, while the upper cylinders are open at the top. Fig. 2 is a vertical section through one line of cylinders of same. Fig. 3 is a section at G—G in Fig. 1. Fig. 3ª is a half section at H—H in Fig. 1. Fig. 4 is a plan view. Fig. 5 shows a modified arrangement of ports employed for use with a spray carbureter of ordinary type. Fig. 6 is a similar section to Fig. 1 of a further form of the invention in which the upper pistons are of the annular or stepped type, the annular part of the larger piston supplying the scavenging air instead of using the crank case. Fig. 7 is a vertical section through one line of cylinders. Fig. 8 is a detail sectional view showing a means for preventing gas leakage between the annular space and the scavenging and charge ports. Fig. 9 is a similar section to Fig. 1, showing a modified construction of engine.

In carrying my invention into practice as illustrated upon the accompanying drawings which show inverted cylinder types of engines but may equally well be arranged to work in any other position, there are four cylinders or piston spaces 1, 2, 3, 4, which are illustrated as being cast in one piece and water jacketed, the water jacketed divisions or diaphragms between the cylinders forming one casting and the cylinders (with or without jackets) being cast separately, the cylinders 1 and 3 being in alinement and the cylinders 2 and 4 being in alinement, the said cylinders 1, 2, 3 and 4 respectively containing pistons 5, 6, 7, and 8, the associated cylinders 1 and 4 being connected by a passage 9 while the associated cylinders 2 and 3 are connected by a passage 10, and in each of these passages which form the combustion chambers the sparking plug or igniting device is preferably located.

At Figs. 1–4 a form of the engine is shown in which the upper cylinders are open at the top, while the lower pistons are of annular or stepped trunk form as indicated by 50, the annular enlargement being located in a cylinder 51 and being at no time in communication with the combustion space during the working strokes. A crank shaft 11 is employed for the whole of the cylinders, carrying two cranks 12 and 13 set at or about 180 degrees to each other the crank 12 being connected to the piston 5 by a connecting rod 14 while the crank 13 is connected to the piston 6 by a connecting rod 15. The pistons 5 and 7 are connected together by the side rods 16 passing through the annular extension 50 and secured to the upper part of the piston 7 by the cross bar 18 these cross bars passing through slots 19 in the upper or outer part of the cylinders 3 and 1 so that the pistons 5 and 7 always move in the same direction, but they receive separate impulses acting in opposite directions on alternate half revolutions of the crank shaft. The pistons 6 and 8 are connected together by similar side rods and obviously move in similar relation to the pistons 5 and 7. As shown these side rods pass through tubes 20 or cylindrical passages bored in the casing in the water space, the rods being provided with piston rings or other means of rendering them gas tight in the tubes or cylindrical passages. The four pistons in conjunction with suitable port openings perform the operations of drawing in the air for expelling the products of combustion and scavenging the cylinders and for drawing in the combustible charge. The compressed air and gaseous charge mix in the combustion chambers and when the pistons 5 and 8 are at or about their inmost positions relative to their combustion chamber the combustible charge is ignited and a working stroke takes place in the associated cylinders.

It will be seen that by this invention on every half revolution of the crank shaft, two pistons receive an impulse the movement of the said pistons operating to control the scavenging and charging operations these operations being effected by the movement of the pistons and it will be obvious that in the arrangement illustrated the engine is well balanced, the two cranks simultaneously receiving impulses acting in opposite directions both on the in and out strokes of the two lines of pistons.

Any suitable number of lines of cylinders may be employed, being arranged in pairs with their respective pairs of cranks set at the most suitable angles to each other to give the greatest continuity of turning effort, and obviously although the opposed cylinders are illustrated as being in alinement, they need not necessarily be so and they need not be of the same diameters.

On the down or inward stroke, the combustible fluid is drawn into the chamber 51 through the atomizer jet 52 which is provided with a non-return valve and obviously as the annular trunk piston descends or moves inwardly the chamber will be partially filled with the combustible charge and when the annular trunk piston approaches the bottom or inward end of its stroke the ports 53 are uncovered which will allow air to enter and mix with the gas. On the up or outward stroke, this annular trunk piston compresses and forces the combustible charge through the passage 54 to the cylinders and combustion chamber of the associated pair of cylinders, while when the annular trunk piston approaches the top or outward end of its stroke the ports are again uncovered allowing air to pass into the crank case in which it is compressed and expelled through the port 56 through the cylinder and combustion chamber on the down or inward stroke of the trunk piston.

The one annular trunk piston is moving out while the other annular trunk piston is moving in, the rising or outward moving annular piston serving to compress and supply the combustible charge to the combustion space above the inward moving working pistons, while the inward moving annular piston is simultaneously supplying air to the same working cylinder and combustion space.

At Fig. 5 a modified arrangement of ports is shown for the engine illustrated at Figs. 1–4 for use when employed with an ordinary carbureter or vaporizer. The carbureter is connected to the chamber 60 which opens to the chamber 51 by the ports 61, while a second set of ports 62 are employed for admitting air to the crank case when the trunk piston is at the top or outward end of its stroke, the ports 61 being of course so arranged that they only communicate with the annular space 51 and under no circumstances with the crank case.

At Figs. 6 and 7 a further form of the engine is shown in which the upper pistons are of the annular or stepped trunk type arranged to supply the scavenging air instead of using the crank case for this purpose. The upper annular pistons 65 when at the top or outward end of their stroke uncover ports 66 admitting air to the space 67 which is fed by the passage 68 to the combustion space simultaneously with the combustible mixture which is supplied by the lower annular stepped trunk piston, the operation of the engine being otherwise similar to that previously described. The upper and lower pistons are connected in a slightly different manner the side rods passing through the annular part, both of the pistons instead of being connected by cross member passing through slots in the cylinder walls, this method of connection being very convenient and as by simply removing the upper nuts 69 and screwing lifting bolts onto the ends of the rods in place of the nuts, the two pistons may be raised or lowered out of their cylinder for inspection.

At Fig. 8 a detail sectional view is shown illustrating a means for preventing leakage between the annular piston space 51 and the passage 68 when the piston rings are above the said passage; said means including a ring 75 located at the bottom of the cylinder walls and held in position by a joint ring 76; the ring 75 being of the spring type and closing around the piston by spring pressure with which it makes a gas tight connection. A form of reversing gear is shown consisting of a double piston valve 70 controlled by any suitable link or other reversing gear. Compressed air is admitted to the port 71 and according to the position of the piston, to either the port 72 on the left hand cylinder or the port 73 through a suitable pipe indicated by dotted lines to the right hand cylinder and it will be seen that when compressed air is so admitted it will operate to give a starting movement to the pistons in a well known manner. Obviously the direction of rotation of the engine after admitting the compressed air will depend upon the position of the piston to which the compressed air is admitted and by manipulating the reversing gear the direction can be widely controlled. To carry out the operations of reversal with certainty two or more sets of engines as herein described will be connected together with their respective pairs of cranks at suitable angles, each engine being provided with reversing valves and gears all connected to a common actuating motion. This reversing gear may be applied to any suitable form of the invention.

In a further form of the invention illustrated at Fig. 9 the upper ends of the upper cylinders are open, the upper pistons being of the simple non-annular type, while annular pistons are used at the bottom. Each upper cylinder has two ports 80, 81 which are uncovered when the piston approaches the bottom of its stroke, the one port 80 communicating with the space in which the lower annular piston is located by a suitable passage 82 which contains the fuel jet or connection, the gas being drawn into the passage on the down stroke of the annular piston from which it is conveyed to the opposite combustion space in manner previously described. The second port 81 communicates with the crank case of the opposite line of pistons by the passage 83 indicated by dotted lines and supplies scavenging air thereto, the air being pressed out of the crank case in manner previously described. The water jacketed division between the upper and lower cylinders of a line are at same temperatures on both faces in contact with explosion, thus getting rid of the troubles due to difference of temperature too much in evidence on the covers of the ordinary type of engine.

What I claim then is:—

1. In a two stroke cycle internal combustion engine, the combination of two pairs of working pistons, each pair being arranged tandem fashion, substantially in alinement, and extension of increased diameter upon a piston of each pair, forming a piston of the annular type adapted to compress the fuel, four corresponding cylinders each containing a piston, side rods connecting together the pistons of each pair, a chamber forming a combustion space common to the inner cylinder of one pair and the outer cylinder of the other pair, a second chamber forming a combustion space common to the remaining two cylinders, and short passages adapted to admit the fuel compressed by said extensions upon the pistons direct to the corresponding cylinder of the opposite pair.

2. In a two stroke cycle internal combustion engine the combination of two pairs of working pistons, each pair being arranged tandem fashion, substantially in alinement; an extension of increased diameter upon the inner piston of each pair adapted to form a piston of the annular type, four corresponding cylinders each containing a piston, side rods connecting the pistons of each pair, a crank shaft having a pair of cranks set at approximately 180 degrees, connecting rods connecting the inner piston of each pair to one of the cranks, a chamber forming a combustion space common to the inner cylinder of one pair and the outer cylinder of the other pair, a second chamber forming a combustion space common to the remaining two cylinders, passages for the admission of scavenging air to the cylinders, means for the drawing in and compressing of the scavenging air by the pistons, means for the drawing in and compressing of the fuel charge by the annular inner pistons of each pair, and short passages adapted to admit the fuel compressed by each of said annular pistons direct to the inner cylinder of the opposite pair.

3. In a two stroke cycle internal combustion engine, the combination of two pairs of working pistons, each pair being arranged tandem fashion, substantially in alinement, four corresponding cylinders each containing a piston, side rods connecting together the pistons of each pair, an extension of increased diameter upon a piston of each pair, forming a piston of the annular stepped type, a chamber forming a combustion space common to the inner cylinder of one pair and the outer cylinder of the other pair, a second chamber forming a combustion space common to the remaining two cylinders, means for admitting fuel to the inner cylinder of each pair into the space inclosed by the said extension, a short passage leading from the said space to the corresponding cylinder of the opposite pair, the wall of the said last mentioned cylinder having a port therein terminating the said passage and so disposed as to open only when the corresponding piston approaches the bottom of its stroke and means for delivering compressed scavenging air to each of the lower cylinders at a point on the opposite side of each cylinder from the fuel inlet therefor, said fuel admitting means being so arranged that fuel is drawn into the said space on the down stroke of the extension pistons, is compressed upon the up stroke, and admitted to the corresponding cylinder of the opposite pair upon the opening of the above mentioned port, said air compressing means being so arranged that the air is admitted slightly before the fuel.

4. In a two stroke cycle internal combustion engine the combination of two pairs of working pistons, each pair being arranged tandem fashion, substantially in alinement, four corresponding cylinders each containing a piston, side rods connecting together the pistons of each pair, an extension of increased diameter upon each of the pistons, forming a piston of the annular stepped type, a chamber forming a combustion space common to the inner cylinder of one pair and the outer cylinder of the other pair, a second chamber forming a combustion space common to the remaining two cylinders, means for admitting fuel to one of each pair of cylinders into the space inclosed by the said extension, a passage leading from the said space to the corresponding cylinder of the opposite pair, a port in the wall of the said cylinder terminating the said passage and so disposed as to be open only when the corresponding piston approaches the bottom of its stroke, said piston serving as means for the drawing in and compressing of the scavenging air, the whole being so arranged that the fuel is drawn into the said space on the down stroke of the piston, is compressed upon the upstroke, and admitted to the corresponding cylinder of the opposite pair upon the opening of the above-mentioned port.

5. In a two stroke cycle internal combustion engine the combination of two pairs of working pistons, each pair being arranged tandem fashion, substantially in alinement, four corresponding cylinders each containing a piston, side rods connecting together the pistons of each pair, an extension of increased diameter upon each of the pistons, forming a piston of the annular stepped type, a chamber forming a combustion space common to the inner cylinder of one pair and the outer cylinder of the other pair, a second chamber forming a combustion space common to the remaining two cylinders, means for admitting fuel to one of each pair of cylinders into the space inclosed by the said extension, a passage leading from said fuel compressing space to the corresponding cylinder of the opposite pair, ports for admitting atmospheric air for scavenging to the second of each pair of cylinders into an air compressing space inclosed by the said extension, a passage leading from the said air compressing space to the other cylinder of the same pair, and ports in the walls of the said cylinder for the admission of scavenging air and fuel respectively adapted to be opened as the piston nears the bottom of its stroke.

6. In a two stroke cycle internal combustion engine the combination of two pairs of working pistons, each pair being arranged tandem fashion, substantially in alinement, side rods connecting together the pistons of each pair, an extension of increased diameter upon each of the pistons forming a piston of the annular stepped type, a chamber forming a combustion space common to the inner cylinder of one pair and the outer cylinder of the other pair, a second chamber forming a combustion space common to the remaining two cylinders, means for admitting fuel to one of each pair of cylinders into the space inclosed by the said extension, a passage leading from the said space to the corresponding cylinder of the opposite pair, ports for admitting atmospheric air from scavenging to the second of each pair of cylinders into the space inclosed by the said extension, a passage leading from the said space to the other cylinder of the same pair, and ports in the walls of the said cylinder for the admission of scavenging air and fuel respectively adapted to be opened as the piston nears the bottom of its stroke, so arranged that the fuel drawn into the annular space on the down-stroke of the piston, is compressed upon the up-stroke and admitted to the corresponding cylinder of the opposite pair upon the opening of the fuel port, the air similarly compressed by the second piston of the opposite pair being just previously admitted upon the opening of the port for admission of scavenging air.

7. In a two stroke cycle internal combustion engine, the combination of two pairs of working pistons, each pair being arranged tandem fashion, substantially in alinement, four corresponding cylinders each containing a piston, side rods connecting together the pistons of each pair, an extension of increased diameter upon each of the pistons, forming a piston of the annular stepped type, a chamber forming a combustion space common to the inner cylinder of one pair and the outer cylinder of the other pair, a second chamber forming a combustion space common to the remaining two cylinders, an atomizing jet disposed in the wall of one of each pair of cylinders and disposed in the space inclosed by one of the said extensions, air ports leading to the said space and adapted to be uncovered as the said extension approaches the bottom of its stroke and a passage leading from the said space to the corresponding cylinder of the opposite pair, the extensions upon the remaining pistons serving to compress the scavenging air.

8. In a two stroke cycle internal combustion engine the combination of two pairs of working pistons, each pair being arranged tandem fashion, substantially in alinement, four corresponding cylinders each containing a piston, side rods connecting together the pistons of each pair, an extension of increased diameter upon each of the pistons, forming a piston of the annular stepped type, a chamber forming a combustion space common to the inner cylinder of one pair and the outer cylinder of the other pair, a second chamber forming a combustion space common to the remaining two cylinders, an atomizing jet disposed in the wall of one of each pair of cylinders and disposed in the space inclosed by the said extension, air ports leading to the said space and adapted to be uncovered as the said extension approaches the bottom of its stroke, ports for admitting atmospheric air for scavenging to the second of each pair of cylinders, into the space inclosed by the said extension, a passage leading from the said space to the other cylinder of the same pair, ports in the walls of the said cylinder serving to admit scavenging air and fuel respectively, adapted to be opened as the piston nears the bottom of its stroke and passages leading from the fuel compression chambers to the combustion chambers.

9. In a two stroke cycle internal combustion engine the combination of two pairs of working pistons, each pair being arranged tandem fashion, substantially in alinement, four corresponding cylinders each containing a piston, side rods connecting together the pistons of each pair, an extension of increased diameter upon each of the pistons, forming a piston of the annular stepped type, a chamber forming a combustion space common to the inner cylinder of one pair and the outer cylinder of the other pair, a second chamber forming a combustion space common to the remaining two cylinders, means for the drawing in and compressing of the scavenging air by the pistons, means for the drawing in and compressing of the fuel charge by the pistons, means for admitting the scavenging air and the fuel charge to the cylinders, and reversing apparatus adapted to give a starting movement to the pistons in either direction.

10. In a two stroke cycle internal combustion engine the combination of two pairs of working pistons, each pair being arranged tandem fashion, substantially in alinement, four corresponding cylinders each containing a piston, side rods connecting the pistons of each pair, an extension of increased diameter upon each of the pistons forming a piston of the annular stepped type, a chamber forming a combustion space common to the inner cylinder of one pair and the outer cylinder of the other pair, a second chamber forming a combustion space common to the remaining two cylinders, an extension on one piston of each pair serving as means for drawing and compressing the scavenging air for the combustion chambers, means for admitting the scavenging air and the fuel charge to the cylinders, and a double piston valve adapted to admit compressed air to the cylinders in order to give a starting movement to the pistons.

11. In a two stroke cycle internal combustion engine the combination of two pairs of working pistons, each pair being arranged tandem fashion, substantially in alinement, four corresponding cylinders each containing a piston, an extension of increased diameter upon each of the pistons, forming a piston of the annular stepped type, side rods connecting together the pistons of each pair and passing through the enlarged portions of the two pistons, a chamber forming a combustion space common to the inner cylinder of one pair and the outer cylinder of the other pair, a second chamber forming a combustion space common to the remaining two cylinders, means for the drawing in and compressing of the scavenging air by the pistons, means for the drawing in and compressing of the fuel charge by the pistons, and means serving to admit the scavening air and the fuel charge to the cylinders.

12. In a two stroke cycle internal combustion engine the combination of two pairs of working pistons each pair being arranged tandem fashion, substantially in alinement, four corresponding cylinders each containing a piston, an extension of increased diameter upon each of the pistons, forming a piston of the annular stepped type, side rods connecting together the pistons of each pair and passing through the enlarged portions of the two pistons, a chamber forming a combustion space common to the inner cylinder of one pair and the outer cylinder of the other pair, a second chamber forming the combustion space common to the remaining two cylinders, means for admitting fuel to one of each pair of cylinders into the fuel-compressing space inclosed by the said extension, ports serving to admit atmospheric air for scavenging to the second of each pair of cylinders into the air compressing space inclosed by the said extension, a passage leading from the said air compressing space to the other cylinder of the same pair, a passage leading from said fuel compressing space to the said cylinder and ports in the walls of the said cylinder serving to admit scavenging air and fuel respectively, adapted to be opened as the piston nears the bottom of its stroke.

In testimony whereof I have signed my name to this specification in the presence of two subscribing witnesses.

THOMAS REID.

Witnesses:
HAROLD J. C. AOIRESTER,
HERBERT J. O. BARTON.

Copies of this patent may be obtained for five cents each, by addressing the "Commissioner of Patents, Washington, D. C."